United States Patent [19]
Wilcher et al.

[11] Patent Number: 5,620,601
[45] Date of Patent: *Apr. 15, 1997

[54] WEAR STRIP ASSEMBLY FOR USE IN A WASTE WATER TREATMENT FACILITY

[75] Inventors: Stephen B. Wilcher, Harleysville; John C. Lodholz, Doylestown, both of Pa.

[73] Assignee: FMC Corporation, Chicago, Ill.

[*] Notice: The portion of the term of this patent subsequent to Jul. 1, 2014, has been disclaimed.

[21] Appl. No.: 530,679

[22] Filed: Sep. 18, 1995

[51] Int. Cl.⁶ ............................................. B01D 21/18
[52] U.S. Cl. ............................ 210/525; 210/526; 210/541; 128/719; 128/721
[58] Field of Search ............................ 210/523, 525, 210/526, 527, 541; 198/719, 721, 728

[56] References Cited

U.S. PATENT DOCUMENTS

| | | | |
|---|---|---|---|
| 2,393,725 | 1/1946 | Walker | 210/526 |
| 3,140,774 | 7/1964 | Johnston et al. | 210/526 |
| 3,313,422 | 4/1967 | Swenson | 210/525 |
| 4,325,480 | 4/1982 | Butt | 198/721 |
| 4,645,598 | 2/1987 | Hannum | 210/526 |
| 4,663,042 | 5/1987 | Rasper et al. | 210/523 |
| 5,468,391 | 11/1995 | Wilcher | 210/525 |

*Primary Examiner*—Christopher Upton
*Attorney, Agent, or Firm*—Michael C. Penn

[57] ABSTRACT

There is provided an a wear strip assembly for use in a waste water treatment facility comprising an anchor plate secured to the bottom of a tank and a wear strip disposed around the anchor plate having a c-shaped cross section. The wear strip may be slid onto the anchor plate. There is also provided a waste water treatment system employing the wear strip assembly.

15 Claims, 4 Drawing Sheets

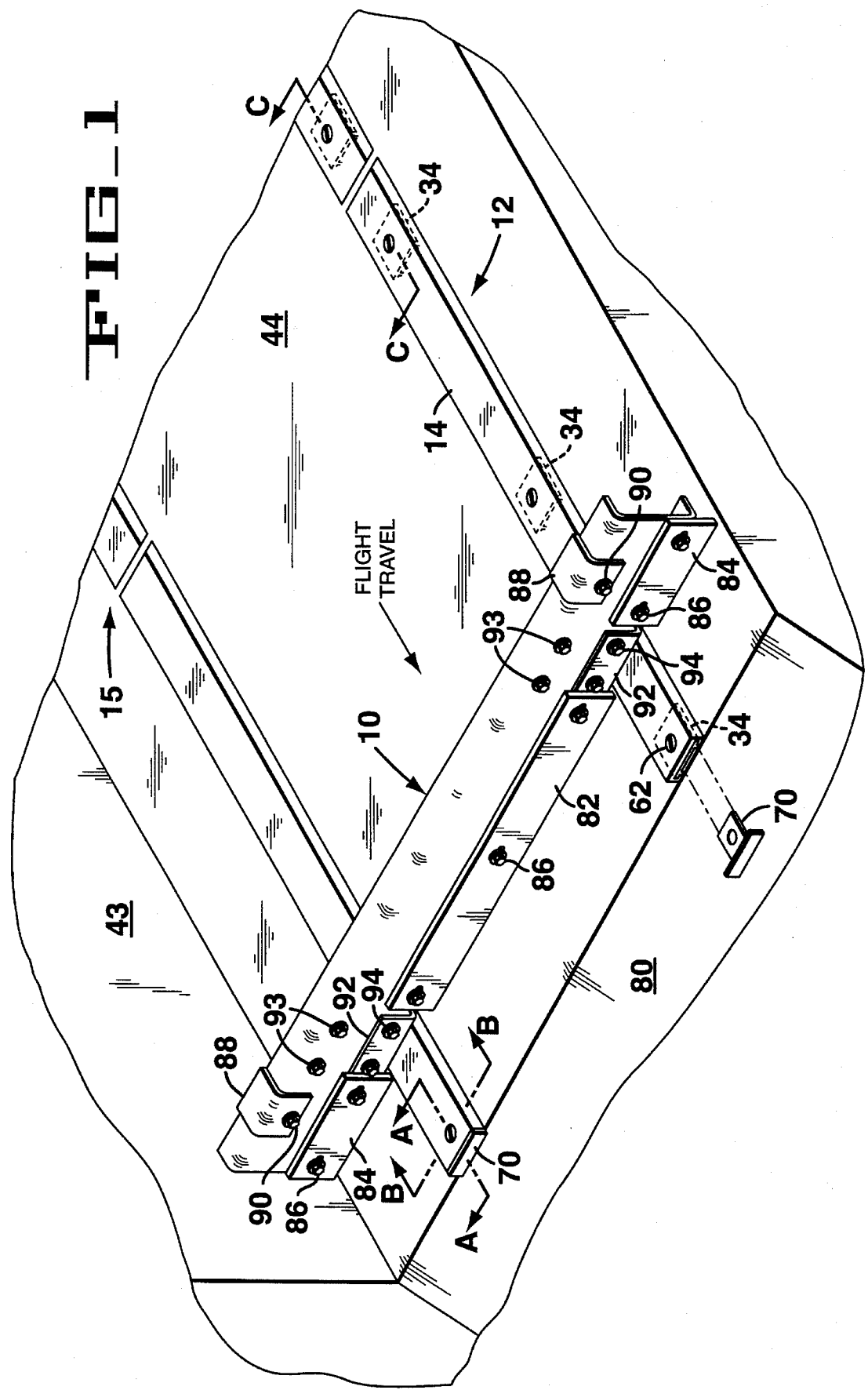

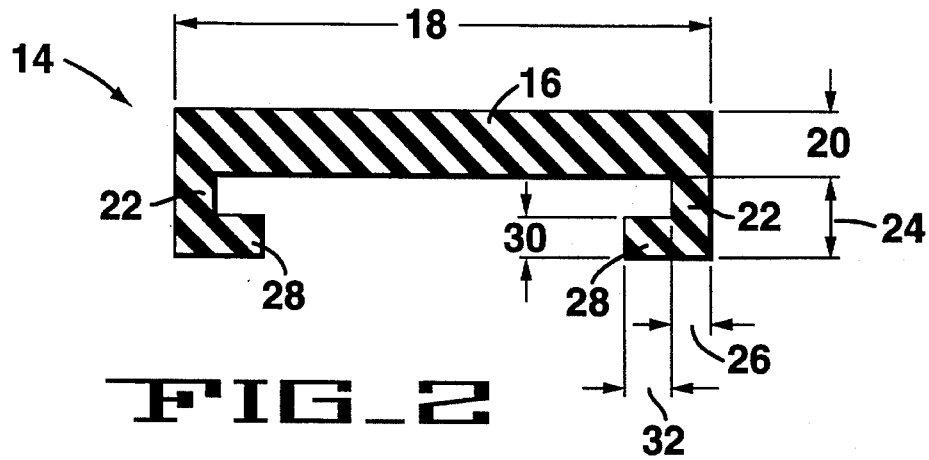
FIG_2
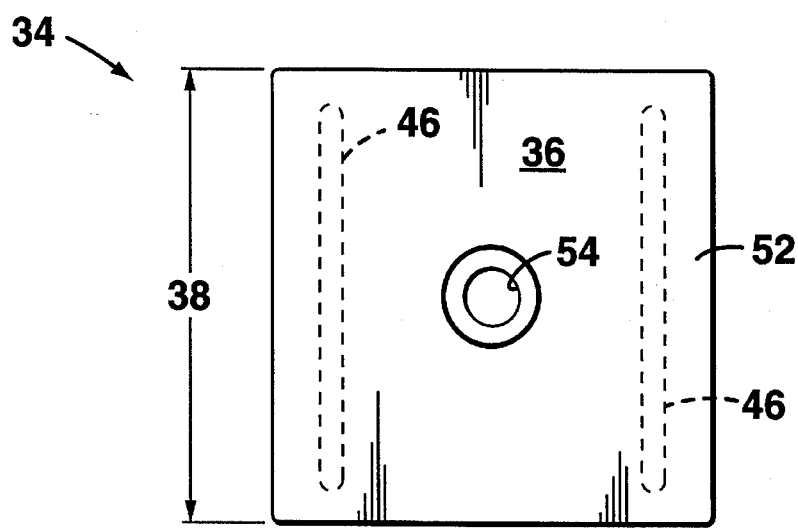
FIG_3A
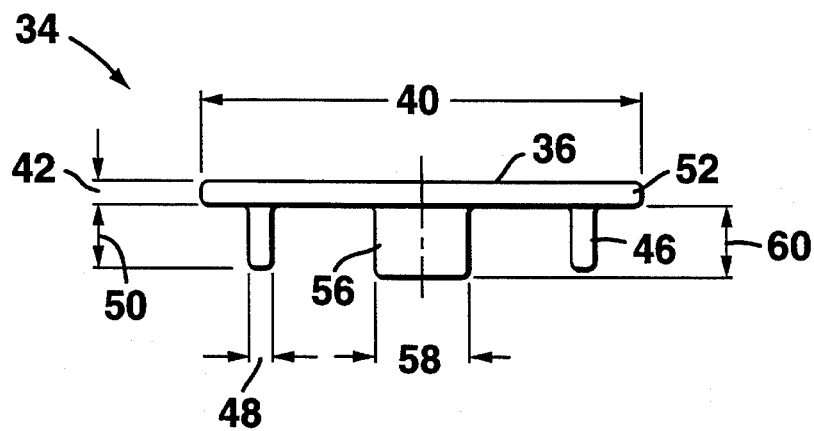
FIG_3B

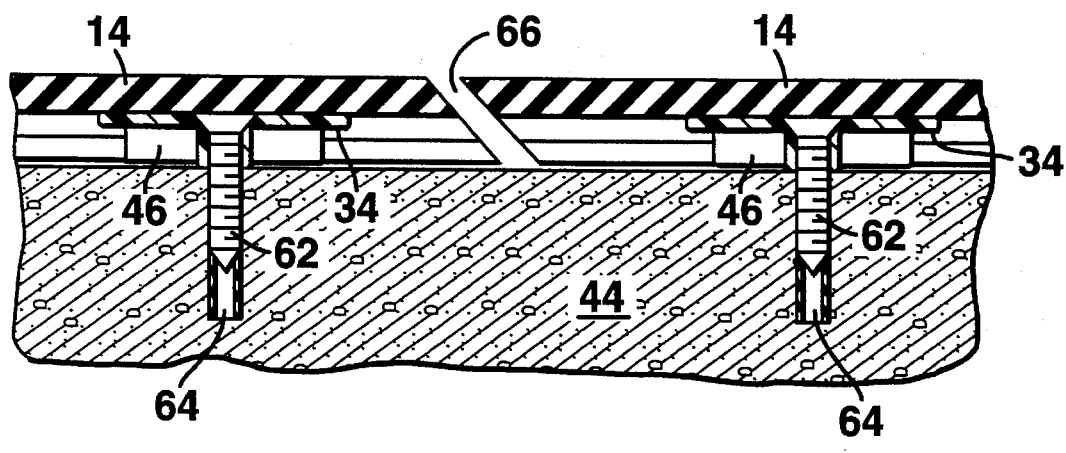
FIG_4
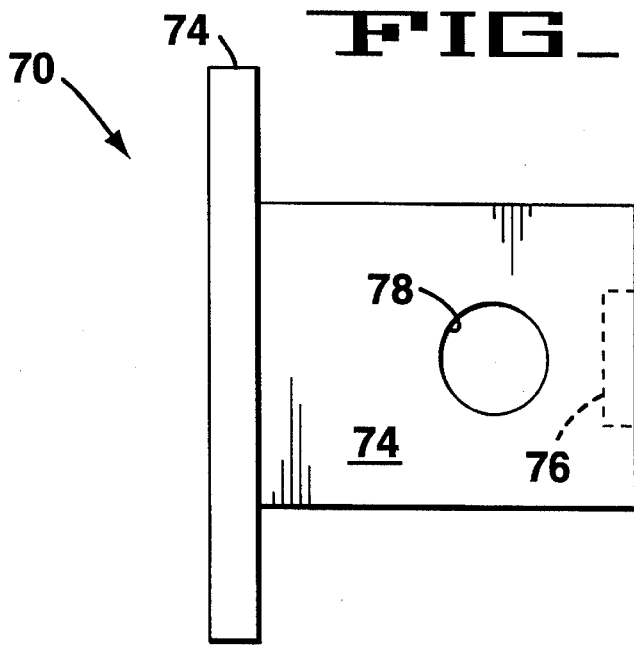
FIG_5A
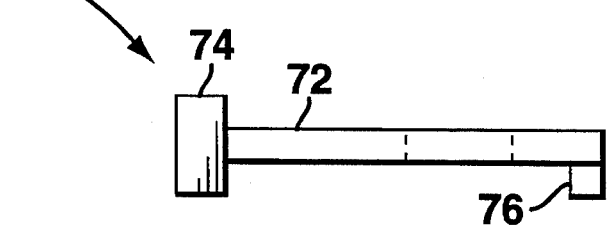
FIG_5B

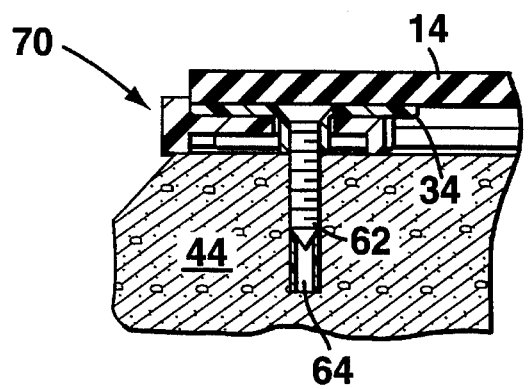
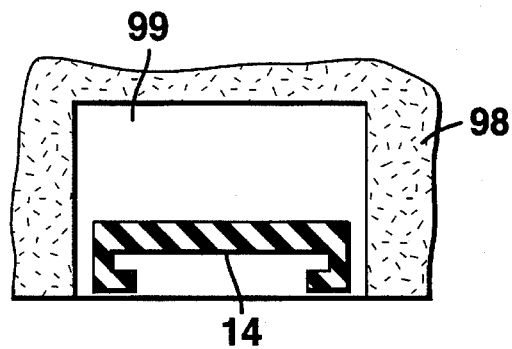
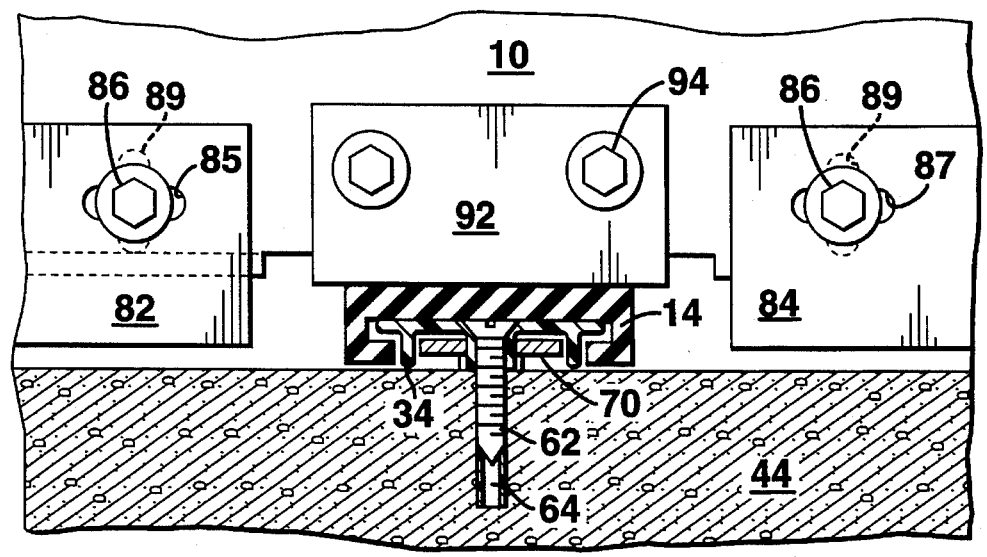
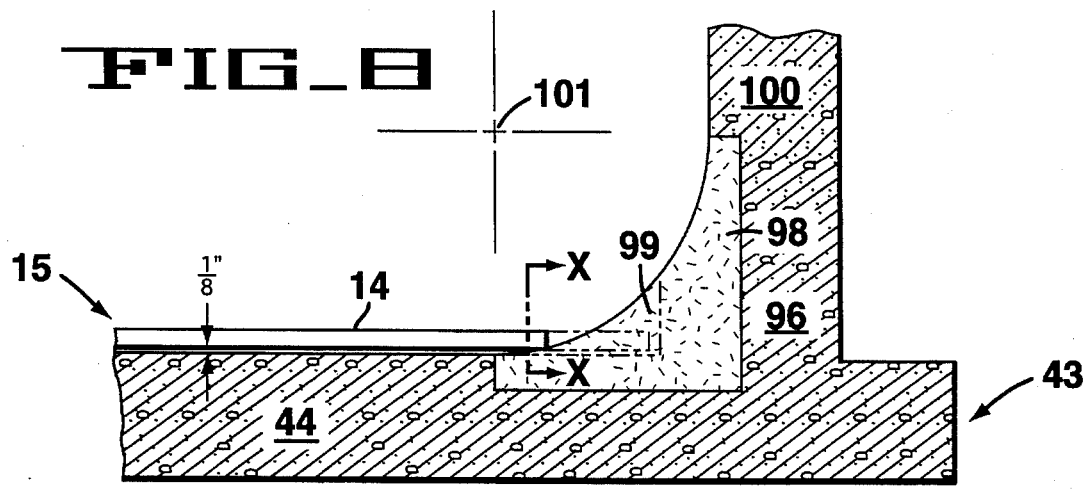

5,620,601

WEAR STRIP ASSEMBLY FOR USE IN A WASTE WATER TREATMENT FACILITY

BACKGROUND OF THE INVENTION

1. Field of the Invention

This invention relates to sludge collectors for removing sludge from rectangular settling tanks and more particularly to a wear strip assembly for supporting a flight for use in sludge collection.

2. Description of Related Art

Sludge collectors are commonly used in waste water treatment plants to scrape settled sludge from the bottom of the settling tank and also to skim floating waste off the surface of the waste water. These sludge collectors typically include a number of sludge flights which are usually elongated members that extend the width of the tank. The ends of the flights are connected to drive chains which carry flights in a circuit lengthwise along the bottom of the tank and back over the surface of the water to perform the scraping and skimming functions.

Rectangular settling tanks used in waste water treatment facilities typically include field installed steel T-rails having floor wear bars disposed on the T-rails for supporting the flight when collecting sludge. The T-rails may be spliced together with separate steel plate splice bars and may be secured to the concrete floors of the settling tank by the use of standard hardware. Alternatively, the floors of the settling tank may be poured without T-rails and the wear bars may be directly mounted to the concrete floors.

Because wear bars are often formed of non-metallic material, such as UHMW polyethylene, nylon, or polyurethane, they have a different coefficient of linear expansion than the concrete floors or steel T-rails to which they may be mounted and special design considerations must be made. Wide variances in the ambient temperature within the concrete basins during installation or variances in water temperature when in final operation are common and therefore the wear bars may become loose, buckled, or otherwise out of line. Consequently, the flights may become jammed and may result in breakage of the chain supporting the flights.

Further, because wear bars are typically secured to the T-rail or concrete floor by screws or bolts, a portion of the wear bar surface is lessened due to the presence of these fasteners. Moreover, a multitude of fasteners may be needed to secure the wear bars to the concrete floors or T-rails, adding to the overall cost and field labor required. It is therefore desirable to have a wear bar that may be secured to the bottom of a settling tank without the use of screws or bolts so that the total wear bar surface may be utilized and the installation is less costly, easier to install and easier to replace when necessary.

SUMMARY OF THE INVENTION

There is provided an a wear strip assembly for use in a waste water treatment facility comprising at least one anchor plate secured to the bottom of a tank and at least one wear strip disposed around the anchor plate having a c-shaped cross section.

There is also provided a wear strip assembly for use in a waste water treatment facility comprising a plurality of anchor plates arranged in a longitudinal direction, each of the anchor plates being secured to the bottom of a tank and a plurality of wear strips, each of the wear strips having a c-shaped cross section and being disposed around a number of the anchor plates.

There is further provided a waste water treatment systems comprising a settling tank comprising a wear bar expansion pocket in a rear end of the settling tank and a wear strip assembly disposed upon a bottom of the tank. The wear strip assembly of the waste water treatment system comprises a plurality of anchor plates arranged in a longitudinal direction, each being secured to the tank bottom and a plurality of wear strips, each having a c-shaped cross section and being disposed around a number of the anchor plates. The plurality of wear strips may expand into the wear bar expansion pocket when the ambient temperature of the concrete basin during installation or the temperature of the water during operation increases.

BRIEF DESCRIPTION OF THE DRAWINGS

FIG. 1 is a partial plan view of a flight disposed on the wear strip assembly of the present invention.

FIG. 2 is a cross section of a wear strip.

FIG. 3A is a top view of an anchor plate. FIG. 3B is an end view of the anchor plate.

FIG. 4 is a cross-sectional view taken along the lines C—C of FIG. 1.

FIG. 5A is a top view of a stop plate. FIG. 5B is a side view of the stop plate.

FIG. 6 is a cross sectional view taken along the lines A—A of FIG. 1.

FIG. 7 is a cross sectional view taken along the lines B—B of FIG. 1.

FIG. 8 is a cross sectional view of the rear end of the settling tank.

FIG. 9 is a cross sectional view taken along the lines X—X of FIG. 8.

DESCRIPTION OF THE PREFERRED EMBODIMENTS

Referring now to FIG. 1, there is shown a plan view of a flight 10 disposed upon the wear strip assembly 12 of the present invention. The wear strip assembly 12 comprises at least a wear strip 14 and an anchor plate 34. Referring also to FIG. 2, the wear strip 14 is c-shaped in cross section.

The wear strip 14 may, for example, be ten feet in length and have a cross sectional area of 2.75 inches squared. The c-shaped cross section is formed of a horizontal base 16 which may have a length 18 of 4.25 inches and a thickness 20 of 0.5 inches, transverse stems 22 which may have a height 24 of 0.625 inches and a thickness 26 of 0.3125 inches, and lips 28 which may have a height 30 of 0.3125 inches and a length 32 of 0.375 inches. A plurality of wear strips 14 are aligned along a longitudinal direction forming a wear bar 15. The wear strip 14 is preferably extruded UHMW polyethylene which, in the preferred embodiment of the invention, is virgin material certified in accordance with ASTM specification D-4020-81, with a molecular weight of 4.0 million or greater, a relative abrasion resistance of twelve, an intrinsic viscosity of twenty four or greater, and a water absorption of zero.

Referring also to FIGS. 3A and 3B, there is shown an anchor plate 34 of the present invention. Preferably, the anchor plate 34 has a top plate 36 which may have a length 38 of 3.5 inches, a width 40 of 3.5 inches, and a height 42 of 0.1875 inches. The anchor plate 34 is secured to the bottom 44 of the tank 43 such that the top plate 36 is generally parallel with the tank bottom 44. Two legs 46 are disposed on the bottom side of the top plate 36 along the longitudinal direction of the wear bar 15 which may have a width 48 of 0.1875 inches and a height 50 of 0.5 inches. Preferably, in the example provided, the longitudinal ends of the legs 46 are shy from reaching the ends of the top plate 36 by approximately 0.25 inches at each end. Further, the legs 46 may be positioned such that they form extensions 52 in the top plate 36 because the sides of the legs 46 are shy from reaching the sides of the top plate 36 by approximately 0.375 inches.

The anchor plate 34 further comprises a bore 54 which may be centrally located on the anchor plate. Preferably, bore 54 is a cored 0.4375 inch diameter hole having a countersink for a 0.375 inch diameter flat head screw 62. A hub 56 is disposed on the bottom side of the top plate 36 around the bore 54. The cylindrical extension may have an outer diameter 58 of 0.75 inches, an inner diameter which matches the 0.375 inch diameter of the bore 54 and a height 60 of 0.5625 inches. The height 50 of the legs 46 is slightly smaller than the height 60 of the hub 56 to allow for some clearance should the tank bottom 44 be uneven.

Referring also to FIG. 4, a flat head screw 62 secures the anchor plate 34 to the tank bottom 44. A plastic anchor 64 may be used to help secure the screw 62 to the tank bottom 44. The anchor plate 34 receives the wear strip 14. Specifically, the lips 28 and stems 22 of the wear strip 14 are preferably slipped around the extensions 52 of the anchor plate 34. Preferably, there are at least three anchor plates for each ten foot section of the wear strip 14. Further, preferably, an anchor plate 34 is disposed approximately six inches from each of the ends of a given wear strip 14.

As stated, the wear strips 14 may each be ten feet in length and the wear strips may be aligned in a longitudinal direction. The wear strips 14 may be aligned, resulting in a wear bar 15 which may be, for example, three hundred feet in length. Preferably, there is a gap 66 of 0.5 inches between wear strips 14 when the wear strip assembly 12 is originally installed. This allows the wear strips 14 to extend somewhat along the longitudinal direction should the temperature increase. Further, the ends of the wear strip 14 should be beveled at approximately forty five degrees as is commonly done in the industry for smooth transition of flight movement.

The anchor plate 34 is preferably non-metallic and is molded as a single unit from polypropylene, UHMW polyethylene, or a similar non-metallic material. In the preferred embodiment of the invention, the polypropylene has the following properties: a tensile strength of 500 psi, and elongation of 10–20%, a tensile modulus of $1.6 \times 10^5$ psi, a Rockwell hardness of 80–110, a flexural modulus of $1.7$–$2.5 \times 10^5$ psi, a specific gravity of 0.905, a specific volume of 30.4 $in^3$/Lb., and a water absorption of 0.01–0.03% in 24 hours based on a ⅛ inch thick material.

Referring now to FIGS. 1, 5A, and 5B, the wear strip assembly 12 may further comprise a stop plate 70 which may be formed of stainless steel number 316. Stop plate 70 comprises a horizontal base 72, a first extension 74, and a second extension 76. The horizontal base 72 comprises a bore 78. Preferably, the horizontal base 72, first extension 74, and second extension 76 are welded together. Alternatively, they may be formed of a single piece of stainless steel material or of the same material as anchor plate 34. The first extension 74 and the second extension 76 are sized such that the horizontal base 72 is generally parallel with the tank bottom 44 and such that there is sufficient room so that the stop plate 70 may be slid under the anchor plate 34.

The horizontal base 72 may be 2.875 inches in length, 2.25 inches in width, and 0.25 inches in thickness. The first extension 74 may be 0.375 inches in length, 4.25 inches in width, and 0.75 inches in thickness. The second extension 76 may be 0.25 inches in length,, one inch in width, and 0.25 inches in thickness. Preferably all corners and edges of the horizontal base are ground in order to remove any sharp corners and edges. The bore is preferably a 0.8125 inch diameter hole which is centered approximately 1.78125 inches from the edges of the extension 74.

Referring also to FIGS. 6 and 7, an anchor plate 34 is secured to the tank bottom 44 at one end of the plurality of wear strips which is disposed near the discharge end 80 of the flight 10 travel (i.e., near a sludge discharge end 80 of the concrete tank 43), as best illustrated in FIG. 1. The stop plate 70 is slidably received at the bottom end of the anchor plate 34. A screw 62 secures both the stop plate 70 and the anchor plate 34 to the concrete tank bottom 44 via the use of a plastic anchor 64. The screw is disposed through bore 78 in the stop plate 70 and bore 54 in the anchor plate. The stop plate helps prevent the expansion of the plurality of wear strips 14 toward the sludge discharge end 80 of the concrete tank 43.

Referring now to FIG. 1, the flight 10, may be, for example, a flight manufactured by FMC Corporation, applicants' assignee. The flight 10 may be formed, for example, of fiberglass and may have floor scrapers 82 and 84 mounted to the center and ends, respectively, of the flight 10. The floor scrapers may be adjustably mounted to the flight 10 via bolts 86, slots 85 and 87 in the scrapers 82, 84, and slots 89 in the flight 10, as seen in FIG. 7.

The flight 10 may have a first pair of wear shoes 88 which may be secured to the flight 10 via bolts 90. The first pair of wear shoes 88 may be used when the flight is performing the skimming operation. The flight 10 may have a second pair of wear shoes 92 which may be secured to the flight 10 via bolts 94. The wear shoes 92 contact the wear bar 15 surface during sludge collection. Bolts 93 may secure the flight 10 to a chain, not shown, for transporting the flight.

UHMW polyethylene, from which the wear strips 14 are formed, tends to have a high coefficient of linear expansion as described earlier. The expansion generally occurs along the longitudinal direction of the wear strips 14. As mentioned earlier, the stop plates 70 prevent the wear strips 14 from expanding into the discharge end 80 of the tank 43. In order to allow for the expansion of the plurality of wear strips 14, a grout pocket 98 is formed in the rear end 96 of the tank 43, as shown in FIGS. 8 and 9. Further, a wear bar expansion pocket 99 is formed in the grout pocket 98.

The wear bar expansion pocket 99 is an indentation in the formation of the grout pocket 98 in the region where the wear bar 15 is located to allow for the expansion of the wear strips 14 toward the rear 96 of the tank 43. As best seen in FIG. 8, the grout pocket 98 is formed in the rear 96 of the tank 43 in a region between the bottom 44 of the tank and the rear side wall 100 and is typically curved in cross section for allowing the flight 10 to move downward while collecting debris in the rear corner prior to entering the scraping operation. Alternatively, the wear bar expansion pocket 99 may be formed directly into the concrete tank 43 without the use of a grout pocket 98. The anchor plates 34 serve as a guide for the expansion of the wear strips 14 toward the rear of the tank and for the contraction of the wear strips away from the rear of the tank.

The dimensions of the wear bar expansion pocket 99 and the grout pocket 98 depend upon the length of the tank 43. Specifically, the longer the tank, the greater the collective amount of expansion caused by the various wear strips 14. Further, the 0.5 inch spacing of the wear strips 14 during installation allows for additional room to which a given wear strip may expand before touching an adjacent wear strip 14.

Where the wear bar 15 is approximately 250 feet in length, the wear bar expansion pocket 99 should extend approximately one foot two inches along the longitudinal direction of the wear bar 15 from where the wear bar is scheduled to end (i.e., one foot two inches from the centerline of the shaft 101 which returns the flights 10 downward for the scraping operation). Further, the wear bar expansion pocket 99 is sized such that the wear bar 15 may easily extend into the wear bar expansion pocket 99. Where, for example, a wear strip 14 has a dimension 18 of 4.5 inches as shown in FIG. 2, the width of the wear bar expansion pocket 99 may be six to seven inches. As shown in the example of FIGS. 8 and 9, the rearmost wear strip 14 has extended approximately one foot into the wear bar expansion pocket 99. The grout pocket 98 is preferably configured such that it begins in a region around the centerline of the shaft 101 and may extend, for example, by a distance beyond the wear bar expansion pocket 99 of several inches.

As also seen in FIG. 8, there is a 1/8 inch gap between the edge of the wear bar 15 and the tank bottom 44. This gap is desirable because the tank bottom 44 may be somewhat uneven.

The anchor plates 34 may first be installed via the use of screws 62 and plastic anchors 64 to secure the anchor plates 34 to the tank bottom 44. Further, a stop plate 70 may slide under the top plate 36 of the anchor plate 34 closest to the discharge end 80 of the tank 43. Similarly, a screw 62 and a plastic anchor may be used to secure the stop plate 70 and anchor plate 34 to the tank bottom 44. The anchor plate 34 closest to the discharge end 80 of the tank 43 may be secured to the tank bottom 44 approximately where the discharge end 80 of the tank 43 begins. The extension 74 of the stop plate 70 prevents the wear bar 15 from extending toward the discharge end 80 of the tank 43 should the temperature increase and expansion occur.

The wear strips 14 may then be slid onto the extensions 52 of the anchor plates 34. As stated earlier, preferably there are three anchor plates 34 for a given wear strip 14, the first and second being approximately six inches from each end of the wear strip where a ten foot wear strip is employed and the third being positioned approximately half way in between the first and second anchor plates during initial installation. However, as stated above, the anchor plate 34 closest to the discharge end 80 of the tank 43 is not positioned six inches from the end of the wear strip 14 but rather at the wear bar end. The anchor plate 34 closest to the rear end of the tank is preferably positioned six inches from the beginning of the grout pocket 98 during initial installation. Should a given wear strip 14 become damaged during the sludge collection process, the old wear strip may easily be removed by cutting off the old wear strip and sliding on a new one.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. A waste water treatment system comprising:
   at least one anchor plate secured to the bottom of a tank; and
   at least one wear strip disposed around said anchor plate, said wear strip having a c-shaped cross section;
   wherein said anchor plate comprises a top plate being generally parallel with the bottom of said tank, a first leg and a second leg arranged along a bottom side of said anchor plate, said first and second legs being disposed at opposing regions of said anchor plate at a distance from each side of said top plate forming extensions in said top plate for receiving said c-shaped wear strip.

2. The invention of claim 1 wherein said wear strip is slid onto said extensions on said anchor plate.

3. The invention of claim 1 further comprising a stop plate, said stop plate being disposed at one end of said wear strip for preventing said wear strip from expanding toward a sludge discharge end of said tank.

4. The invention of claim 1 wherein said wear strip comprises UHMW polyethylene material and said anchor plate comprises polypropylene material.

5. A waste water treatment system comprising:
   a plurality of anchor plates arranged in a longitudinal direction, each of said anchor plates being secured to the bottom of a tank; and
   a plurality of wear strips, each of said wear strips having a c-shaped cross section and being disposed around a number of said anchor plates;
   wherein each of said anchor plates comprises a top plate being generally parallel with the bottom of said tank, a first leg and a second leg arranged along a bottom side of said anchor plate, said first and second legs being disposed at opposing regions of said anchor plate at a distance from each side of said top plate forming extensions in said top plate for receiving said c-shaped wear strip.

6. The invention of claim 5 wherein each of said wear strips is disposed around three of said anchor plates.

7. The invention of claim 5 wherein said plurality of wear strips are disposed approximately one-half-of-an-inch apart along said longitudinal direction.

8. The invention of claim 5 wherein each of said wear strips is slid onto said extensions in said anchor plate.

9. The invention of claim 5 wherein each of said anchor plates comprises a bore for receiving a fastener for securing each of said anchor plates to said tank bottom.

10. The invention of claim 5 wherein one anchor plate is secured to said tank at one end of said plurality of wear strips, said one end being disposed near a sludge discharge end of said tank, and a stop plate is slidably received at a bottom end of said one anchor plate for preventing the expansion of said plurality of wear strips toward said discharge end.

11. The invention of claim 10 wherein said stop plate comprises a horizontal base, a first extension at a first end of said horizontal extension for preventing said plurality of wear strips from expanding toward said discharge end and a second extension disposed at an opposing end of said horizontal base.

12. A waste water treatment system comprising:
   a settling tank comprising a wear bar expansion pocket in a rear end of said settling tank; and
   a wear strip assembly disposed upon a bottom of said tank, said wear strip assembly comprising a plurality of anchor plates arranged in a longitudinal direction, each of said anchor plates being secured to said tank bottom and a plurality of wear strips, each of said wear strips having a c-shaped cross section and being disposed around a number of said anchor plates;

wherein said plurality of wear strips may expand into said wear bar expansion pocket when a temperature rise occurs and wherein each of said anchor plates comprises a top plate being generally parallel with the bottom of said tank, a first leg and a second leg arranged along a bottom side of said anchor plate, said first and second legs being disposed at opposing regions of said anchor plate at a distance from each side of said top plate forming extensions in said top plate for receiving said c-shaped wear strip.

13. The invention of claim 12 wherein each of said anchor plates comprises a bore for receiving a fastener for securing each of said anchor plates to said tank bottom.

14. The invention of claim 12 wherein one anchor plate is secured to said tank at one end of said plurality of wear strips, said one end being disposed near a sludge discharge end of said tank, said discharge end being disposed at an opposing end to said rear of said tank, and a stop plate is slidably received at a bottom end of said one anchor plate for preventing the expansion of said plurality of wear strips toward said discharge end.

15. The invention of claim 14 wherein said stop plate comprises a horizontal base, a first extension at a first end of said horizontal extension for preventing said plurality of wear strips from expanding toward said discharge and a second extension disposed at an opposing end of said horizontal base.

* * * * *